United States Patent
Magnolia et al.

(10) Patent No.: US 10,664,916 B2
(45) Date of Patent: May 26, 2020

(54) SYSTEMS AND METHODS FOR IMPLEMENTING A PLATFORM FOR INVESTING

(71) Applicant: THE BANK OF NEW YORK MELLON, New York, NY (US)

(72) Inventors: Douglas J. Magnolia, New York, NY (US); Jennifer C. Cole, Bryn Mawr, PA (US)

(73) Assignee: THE BANK OF NEW YORK MELLON, New York, NY (US)

( * ) Notice: Subject to any disclaimer, the term of this patent is extended or adjusted under 35 U.S.C. 154(b) by 0 days.

(21) Appl. No.: 16/169,395

(22) Filed: Oct. 24, 2018

(65) Prior Publication Data
US 2019/0057452 A1    Feb. 21, 2019

Related U.S. Application Data

(63) Continuation of application No. 14/216,851, filed on Mar. 17, 2014, now Pat. No. 10,147,140.

(51) Int. Cl.
*G06Q 40/00* (2012.01)
*G06Q 40/06* (2012.01)

(52) U.S. Cl.
CPC .................................. *G06Q 40/06* (2013.01)

(58) Field of Classification Search
CPC .................................................... G06Q 40/06
USPC .............................. 705/36 R, 14.18; 235/375
See application file for complete search history.

(56) References Cited

U.S. PATENT DOCUMENTS

| | | | |
|---|---|---|---|
| 6,243,688 B1 * | 6/2001 | Kalina | B42D 12/00 |
| | | | 705/14.18 |
| 6,594,640 B1 | 7/2003 | Postrel | |
| 8,342,399 B1 * | 1/2013 | McGhie | G06Q 20/06 |
| | | | 235/375 |
| 2003/0225619 A1 | 12/2003 | Dokken et al. | |
| 2010/0250355 A1 | 9/2010 | McInnes et al. | |
| 2012/0047008 A1 | 2/2012 | Alhadeff et al. | |
| 2013/0080351 A1 * | 3/2013 | Schneider | G06Q 40/04 |
| | | | 705/36 R |

OTHER PUBLICATIONS

Non-final Office Action U.S. Appl. No. 14/216,851 dated Nov. 1, 2016.
Notice of Allowance U.S. Appl. No. 14/216,851 dated Aug. 1, 2018.

* cited by examiner

*Primary Examiner* — Samica L Norman
(74) *Attorney, Agent, or Firm* — Pillsbury Winthrop Shaw Pittman, LLP

(57) ABSTRACT

Systems and methods to implement a platform for investing allow customers to purchase shares of investment funds using a balance in a closed-loop stored-value account, a financial account, and/or both. Part of a balance is (periodically or automatically) withdrawn, and used to fund the purchase. Purchases may be triggered by predetermined and specified content and/or activity occurring in a social media stream associated with a customer. Withdrawals from multiple customers may be aggregated into a single periodical transaction.

33 Claims, 7 Drawing Sheets

SYSTEMS AND METHODS FOR IMPLEMENTING A PLATFORM FOR INVESTING

CROSS-REFERENCE TO RELATED APPLICATIONS

This application is a Continuation Application of U.S. Ser. No. 14/216,851, filed Mar. 17, 2014, the subject matter of which is incorporated herein by reference in entirety.

FIELD

The disclosure relates to systems and methods for implementing a platform for investing by customers and, in particular, using loyalty points and/or closed-loop stored-value balances or financial account balances to purchase shares of investment funds automatically and/or periodically. Purchases may be triggered by predetermined and specified content and/or activity occurring in a social media stream associated with a customer.

BACKGROUND

Users can obtain stored-value accounts from stored value providers. Stored-value can be earned and/or awarded by a provider in return for using particular goods and/or services associated with the provider. Common examples of stored-value accounts include air miles, and grocery store loyalty accounts. Users can obtain financial accounts from financial account providers. Common examples of financial accounts include checking accounts with a bank or credit union. Accessing accounts online may be known. Accessing services, applications, and web pages via the internet is known. Presenting and/or providing information via the internet, in particular through client computing platforms, is known. Using a browser software application to present a web page and/or other information on a client computing platform is known.

SUMMARY

One aspect of the disclosure relates to systems configured to implement a platform for investing. As used herein, the term "investing" refers to the purchase and/or ownership of shares of one or more investment funds, including but not limited to mutual funds. The system may facilitate interaction between users and providers of stored-value accounts, providers of financial accounts, providers of investment accounts and/or services, investment providers, providers of administration services, providers of social media, and/or other related entities, which may collectively be referred to as providers. Individual providers may interact with the system through individual servers.

As used herein, the individual users of the system may be interchangeably referred to as customers. The system may facilitate interaction between providers. The system and/or any related entities that interact with the system may be deployed using a (public) network and/or commercial web services. The system may facilitate customer interaction through client computing platforms. Individual client computing platforms may be associated with individual customers.

The system may include physical storage, an interface, one or more servers, one or more physical processors, one or more computer program components, and/or other components. The system may interact between customers, stored-value providers, financial account providers, investment providers, administration providers, sweep account providers, social media providers, omnibus account providers, and/or other entities, including but not limited to financial institutions. Individual providers may employ one or more servers, processors, interfaces, and/or other computing platforms to accomplish system interaction, by way of non-limiting example: through computer program components.

Stored-value providers may provide accounts to customers, e.g. stored-value (SV) accounts and/or closed-loop stored-value (CLSV) accounts, and/or other accounts. Stored value may be considered closed-loop stored value if the stored value can only be used and/or redeemed with a limited set of entities, e.g. only the stored-value provider that provided this particular stored value. Stored value that may be used and/or redeemed substantially anywhere may be referred to as open-loop stored value. A stored-value provider may be referred to herein as an SV provider. A closed-loop stored-value provider may be referred to herein as a CLSV provider.

Stored-value accounts may have a balance. For example, airlines, grocery stores, coffee shops, internet merchants, and other commercial entities that interact with client, consumers, and/or other customers may be considered stored-value providers. In some embodiments, some types of providers may be referred to as sponsors. Balances may include points, money, currency, and/or other types of balance. Stored-value providers may give and/or assign value (e.g. increase a customer's balance) in exchange for specific activities (including buying and/or using particular goods and/or services), as a reward for customer loyalty, and/or for other reasons. A stored-value account balance may be referred to herein as an SV account balance. A closed-loop stored-value account balance may be referred to herein as a CLSV account balance. Loyalty-based stored-value is an example of stored-value. Stored-value may be earned, won, received, assigned, and/or otherwise conveyed to customers.

Financial account providers may provide financial accounts, e.g. checking accounts, savings accounts, and/or other accounts. Financial accounts may have a balance. Balances may include points, money, currency, and/or other types of balance.

Investment providers may provide and/or manage one or more investment funds. For example, an investment fund may include a mutual fund. Investment funds may include shares. Investment providers may accept and/or receive purchases requests and/or purchase orders for shares of one or more investment funds. Purchases may be made by a financial institution, including but not limited to a bank, a trust company, an investment firm, and/or other financial institutions. Alternatively, and/or simultaneously, purchases may be made on behalf of investors, including but not limited to individual customers. In some embodiments, purchases may be made in aggregation, for example by adding or summing up purchases made on behalf on multiple investors and/or customers. In some embodiments, purchases may be made periodically, e.g. every month, every quarter, etc. In some embodiments, purchases may be made responsive to detection and/or occurrence of predetermined and specified content and/or activity in one or more social media streams, e.g. a social media stream associated with a particular customer.

Investment account providers may provide and/or manage investment accounts for investors, including but not limited to individual customers. Individual investment accounts may be owned by individual customers. Individual customers may be account holders for individual investment accounts. Investment account providers may purchase shares of investment funds from investment providers, e.g. on behalf of one or more account owners. Individual investment accounts may include a balance of one or more investment funds. In some embodiments, an investment account provider may receive, for example from a sweep account provider or omnibus account provider, a balance and/or money accompanied by one or more requests and/or authorizations to make a purchase, with one or more investment providers, of investment funds. A purchase may be made on behalf of one or more account owners. In some embodiments, investment account providers receive, from an administration provider, customer-specific information related to requests and/or authorizations to make purchases. In some embodiments, the received customer-specific information corresponds to the received balances and/or money, and both pertain to the same one or more purchases. In some embodiments, actions performed by investment account providers may occur periodically and/or automatically, e.g. programmatically arranged to occur more than once, and/or in response to particular detections and/or occurrences, as described elsewhere in this disclosure.

Administration providers may provide interaction between customers and other entities in the system. For example, an administration provider may provide and/or present an interface to customers such that they can inspect balances with stored-value providers, financial account providers, investment account providers, and/or other providers. In some embodiments, an administration provider may provide options for individual customers to purchase investment funds, wherein such a purchase may be funded through a stored-value account balance or a financial account balance. In other words, all or some of a stored-value account balance or a financial account balance may be, if needed, converted into money or currency, and subsequently used to fund a purchase. Conversion and exchange may be used interchangeably herein, as may derivative terms such as conversion rate and exchange rate. Administration providers may interact with one or more stored-value providers, one or more financial account providers, one or more investment account providers, individual customers, and/or other entities within the system.

Through an administration provider, a customer may set up an automatic and/or period purchase of investment funds. Such purchases may be subject to restrictions, including customer-initiated restrictions and/or other restrictions. For example, a customer may restrict purchases not to exceed a predetermined value. For example, a purchase may be restricted to the balance of a stored-value account or financial account, and/or a fraction thereof. For example, an investment account provider may restrict purchases that fail to exceed a minimum threshold value, such as a cent. In some embodiments, periodic purchases may be for a fixed amount (with the caveat that this amount must be available in a particular stored-value account or financial account). In some embodiments, period purchases may be for variable amounts, such that the particular amount is based on one or more variables.

Sweep account providers may provide and/or manage sweep accounts on behalf of one or more stored-value providers. In some embodiments, an individual sweep account may correspond to an individual stored-value provider. A sweep account provider may (periodically and/or automatically) receive deposits (for example in money) from stored-value providers, to be deposited in corresponding sweep accounts. As used herein, received deposits may be referred to as received deposit requests. Individual deposit requests may effectuate one or more amounts to be deposited in one or more sweep accounts. Alternatively, and/or simultaneously, individual deposit requests may authorize purchases of investment funds, and/or transfer of an authorization to purchase investment funds. In some embodiments, individual sweep accounts may be unrelated to individual customers, even though an individual deposit may be funded through one or more stored-value account balances, with a stored-value provider, of individual customers. For example, the individual customers may not own a sweep account.

Sweep account providers may (periodically and/or automatically) transfer balances (for example corresponding to one or more received deposits) to one or more investment account providers. In some embodiments, such transfers may be accompanied by a transfer of one or more purchase requests for investment funds. Alternatively, and/or simultaneously, such transfers may be accompanied by a transfer of one or more authorizations of one or more purchases of investment funds.

Omnibus account providers may provide and/or manage omnibus accounts, e.g. for one or more financial institutions. An omnibus account provider may (periodically and/or automatically) receive deposits (for example in money) from financial account providers, to be deposited in one or more omnibus accounts. For example, deposits may include automated clearing house (ACH) transfers from financial (checking) accounts. Deposits may correspond to requests and/or authorizations to purchase investment funds, and/or transfer an authorization to purchase investment funds. In some embodiments, deposits may be aggregated to request and/or authorize an aggregated purchase of investment funds.

Omnibus account providers may (periodically and/or automatically) transfer balances (for example corresponding to one or more received deposits) to one or more investment account providers. In some embodiments, such transfers may be accompanied by a transfer of one or more purchase requests for investment funds. Alternatively, and/or simultaneously, such transfers may be accompanied by a transfer of one or more authorizations of one or more purchases of investment funds.

Social media providers may provide and/or manage social media streams. Social media providers may provide, through one or more servers, access to social media streams. As used herein, the term "social media stream" may include content shared through online social networking, online messaging (of text, images, video, audio, or animated content, and/or any combination thereof), online photo sharing, online video sharing, microblogging, content shared through submitting or posting in an online forum, and/or other types of online content sharing. In some embodiments, social media streams may include news feeds, web feeds, and/or other ways to share information online. Online services using and/or including social media streams may include, by way of non-limiting example, Facebook™, Twitter™, Instagram™, WhatsApp™, Snapchat™, etc. etc. In some embodiments, social media streams may be associated with particular individual customers. For example, a particular social media stream of tweets may be associated with a particular Twitter™-user.

Social media streams may be monitored for instances of investment triggering content (ITC). Instances of ITC and/or occurrences of ITC may be detected by the system. In some embodiments, investment triggering content may include a predefined keyword or tag that is submitted and/or posted in a particular social media stream by a particular customer. Individual instances of ITC may be associated with a particular social media stream and/or a particular customer.

For example, a predefined keyword may be "#sumday". Responsive to detection and/or occurrence of ITC, an administration provider may transfer a transfer request to a particular financial account provider to withdraw an amount (e.g. a predetermined amount) from the financial account associated with and/or owned by the particular customer, and deposit the amount into a particular omnibus account. From the particular omnibus account, the amount (optionally aggregated with amounts withdrawn from balances of other customers) may be transferred and/or deposited with investment account provider 17 to fund purchases of investment funds on behalf of the particular customer.

As used herein, any association (or correspondency) involving providers, customers, and/or another entity that interacts with any part of the system, may be a one-to-one association, a one-to-many association, a many-to-one association, and/or a many-to-many association or N-to-M association (note that N and M may be different numbers greater than 1).

Customers and/or providers may interact with the system through client computing platforms. Client computing platforms may include one or more processors configured to execute computer program components. The computer program components may be configured to enable a user associated with a client computing platform to interact with the system, any component thereof, other client computing platforms, and/or provide other functionality attributed herein to client computing platforms. By way of non-limiting example, client computing platforms may include one or more of a desktop computer, a laptop computer, a handheld computer, a NetBook, a Smartphone, a tablet, a mobile computing platform, a gaming console, a television, a device for streaming internet media, and/or other computing platforms.

The one or more servers included in the system may include one or more processors configured to execute computer program components. The system may include physical storage, which may be physically located in one location, or may be distributed in different locations, including but not limited to "the cloud".

Interaction with the system may be accomplished through web pages, (mobile) applications, apps, stand-alone applications, desktop applications, and/or other types of software applications capable of interacting with a network, for example the internet. As used herein, content provided through any type of software application capable of interacting with a network may be referred to as a web page (including, but not limited to, mobile applications or "apps").

Web pages may be rendered, interpreted, and/or displayed for presentation using a computing platform, such as a client computing platform. As used herein, displaying information through a mobile application—or app—is included in the term presentation. Presentation of web pages may be supported through a display, screen, monitor of the computing platform, and/or projection by the computing platform. Web pages may be accessible from a local computing platform (e.g. not currently connected to the internet) and/or hosted by a remote web server (e.g. connected to the internet and/or one or more other networks). Web pages may be accessed through a browser software application being executed on a computing platform.

As used herein, mobile applications may be included in the term browser software application. Web pages may be static (e.g. stored using electronic storage that is accessible by a web server), dynamic (e.g. constructed when requested), and/or a combination of both. The browser software application may be configured to render, interpret, and/or display one or more web pages for presentation using a computing platform. The digital content included in a web page may have been provided by one or more content providers. A set of linked and/or organized web pages may form a website. A website may include a set of related and/or linked web pages hosted on one or more web servers and accessible via a network, e.g. the internet. Websites and/or web pages may be accessible through an address called a uniform resource locator (URL).

By virtue of the systems and methods described in this disclosure, a customer may, in effect, purchase investment funds with a balance in a stored-value account and/or a balance in a financial account. Purchases may be triggered by predetermined and specified content and/or activity occurring in a social media stream associated with a customer.

These and other objects, features, and characteristics of the servers, systems and/or methods disclosed herein, as well as the methods of operation and functions of the related elements of structure and the combination of parts and economies of manufacture, will become more apparent upon consideration of the following description and the appended claims with reference to the accompanying figures, all of which form a part of this specification, wherein like reference numerals designate corresponding parts in the various figures. It is to be expressly understood, however, that the figures are for the purpose of illustration and description only and are not intended as a definition of any limits. As used in the specification and in the claims, the singular form of "a", "an", and "the" include plural referents unless the context clearly dictates otherwise. As used in the specification and in the claims, in a list of items that includes the separator "and/or", combinations of those items, insofar as practically possible, are envisioned as embodiments.

DETAILED DESCRIPTION

Figure 1:
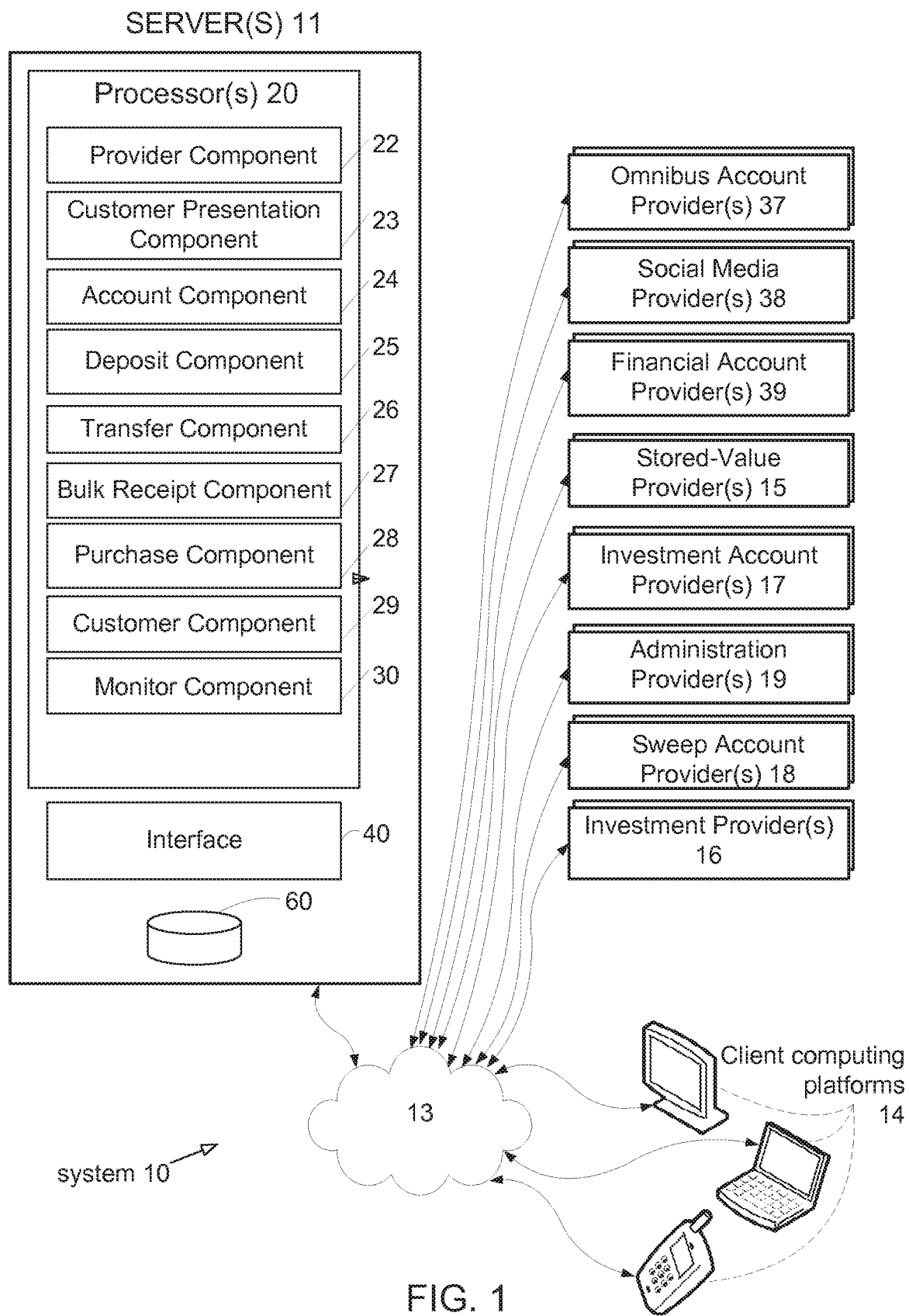
FIGS. 1 and 2 schematically illustrate systems configured to implement a platform for investing closed-loop stored-value in accordance with one or more implementations.
Figure 2:
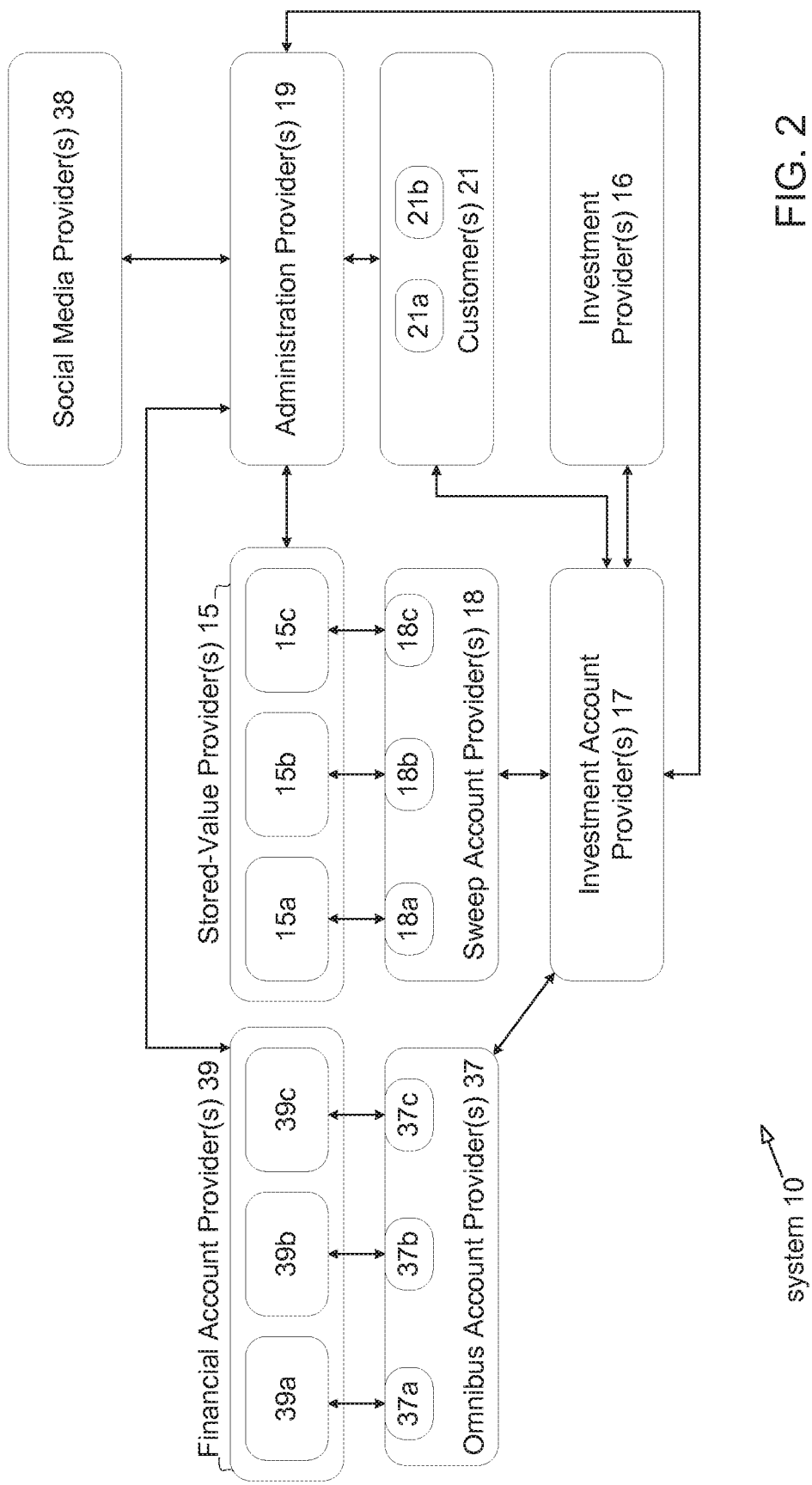

FIG. 1 illustrates a system 10 configured to implement a platform for investing. System 10 may facilitate communication between customers and providers, as well as between providers. As depicted in FIG. 2, customers may be referred to as customers 21, for example first customer 21a and second customer 21b. Note that connections between components in FIG. 2 may connote, by way of illustration and without limitation, relationships, ownership, transferal of requests, information, and/or money. Returning to FIG. 1, the providers may include, by way of non-limiting example, one or more stored-value providers 15, one or more investment providers 16, one or more investment account providers 17, one or more administration providers 19, one or more sweep account providers 18, one or more financial account providers 39, one or more social media providers 38, one or more omnibus account providers 37, and/or other entities and/or participants. Customers may interact with system 10 through client computing platforms 14. Interaction may be supported by one or more networks 13, including but not limited to the internet.

Stored-value providers 15 may provide accounts to customers, e.g. stored-value (SV) accounts and/or closed-loop stored-value (CLSV) accounts, and/or other accounts. As depicted in FIG. 2, stored-value providers 15 may include, by way of non-limiting example, a first stored-value provider 15a, a second stored-value provider 15b, and a third stored-value provider 15c. For example, stored-value provider 15a may correspond to an airline, stored-value provider 15b may correspond to a grocery store, and stored-value provider 15c may correspond to a coffee shop. Stored-value providers 15 may provide and/or manage CLSV accounts having CLSV account balances for individual customers, e.g. customers 21a and 21b.

Financial account providers 39 may provide financial accounts to customers. As depicted in FIG. 2, financial account providers 39 may include, by way of non-limiting example, a first financial account provider 39a, a second financial account provider 39b, and a third financial account provider 39c. For example, financial account provider 39a may correspond to a national bank, financial account provider 39b may correspond to a credit union, and financial account provider 39c may correspond to a credit card issuer. Financial account providers 15 may provide and/or manage financial accounts having account balances for individual customers, e.g. customers 21a and 21b.

Investment providers 16 may provide and/or manage one or more investment funds. Investment funds may include shares. Investment providers 16 may accept and/or receive purchases requests and/or purchase orders for shares of one or more investment funds. Purchases may be made by, e.g., investment account providers 17, e.g. on behalf of customers. In some embodiments, purchases may be made in aggregation, for example on behalf on multiple customers. In some embodiments, purchases may be made periodically, e.g. every month, every quarter, etc.

Administration providers 19 may provide interaction between customers and other entities in the system. For example, an administration provider 19 may provide and/or present an interface 40 to customers such that they can inspect balances with stored-value providers 15, financial account providers 39, social media providers 38, investment account providers 17, and/or other providers. In some embodiments, an administration provider 19 may provide options for individual customers to purchase investment funds, wherein such a purchase is funded through one or both of a stored-value account balance with a stored-value provider 15 and/or a financial account balance with a financial account provider 39.

Sweep account providers 18 may provide and/or manage sweep accounts on behalf of one or more stored-value providers 15. In some embodiments, an individual sweep account may correspond to an individual stored-value provider 15. For example, as depicted in FIG. 2, sweep account 18a may correspond to stored-value provider 15a, sweep account 18b may correspond to stored-value provider 15b, and sweep account 18c may correspond to stored-value provider 15c. A sweep account provider 18 may (periodically and/or automatically) receive one or more deposits (for example in money) from one or more stored-value providers 15, to be deposited in corresponding sweep accounts. For example, a deposit from stored-value provider 15a may be deposited in sweep account 18a, and so forth. Sweep account providers 18 may (periodically and/or automatically) transfer balances (for example corresponding to one or more received deposits) to one or more investment account providers 17.

Omnibus account providers 37 may provide and/or manage omnibus accounts, e.g. on behalf of one or more financial account providers 39. In some embodiments, an individual omnibus account may correspond to an individual financial account provider 39. For example, as depicted in FIG. 2, omnibus account 37a may correspond to financial account provider 39a, omnibus account 37b may correspond to financial account provider 39b, and omnibus account 37c may correspond to financial account provider 39c. An omnibus account provider 37 may (periodically and/or automatically) receive one or more deposits from one or more financial account providers 39, to be deposited in corresponding omnibus accounts. For example, a deposit from financial account provider 39a may be deposited in omnibus account 37a, and so forth. Omnibus account providers 37 may (periodically and/or automatically) transfer balances (for example corresponding to one or more received deposits) to one or more investment account providers 17.

As depicted in FIG. 1 and/or FIG. 2, system 10 may include one or more servers 11, one or more processors 20, physical storage 60, an interface 40, and/or other components.

One or more processors 20 (interchangeably referred to herein as processor 20) may be configured to execute computer program components. The computer program components may include a provider component 22, a customer presentation component 23, an account component 24, a deposit component 25, a transfer component 26, a bulk receipt component 27, a purchase component 28, a customer component 29, a monitor component 30, and/or other components. The functionality provided by components 22-30 may be attributed for illustrative purposes to one or more particular components of system 10, for example a particular provider. This is not intended to be limiting in any way, and any functionality may be provided by any component or entity described herein.

Provider component 22 may be configured to receive customer-specific information. For example, provider component 22 may receive customer-specific information from one or more stored-value providers 15 and/or one or more financial account providers 39. In some embodiments, provider component 22 may be included in (and/or executed by a processor operating in service of) an administration provider 19. In some embodiments, provider component 22 may be configured to transfer, to one or more stored-value providers 15, a transfer request on behalf of one or more individual customers. Alternatively, and/or simultaneously, in some embodiments, provider component 22 may be configured to transfer, to one or more financial account providers 39, a transfer request on behalf of one or more individual customers. For example, a transfer request may specify an amount of a balance, such as an SV balance. The specified amount may be intended to be used to purchase investment funds. The balance may represent money or currency. In some embodiments, the balance may include award point, loyalty points, and/or other types of account balance that do not (directly) represent money or currency. A transfer request may (contractually) effectuate a stored-value provider 15 to convert the specified amount of an SV balance into an amount of money, e.g. based on a conversion rate. A transfer request may (contractually) effectuate a financial account provider 39 to deposit the specified amount of a financial account balance into a (specified) omnibus account.

By way of non-limiting example, and in reference to FIG. 2, assume that customer 21a has a first SV account with stored-value provider 15a and a second SV account with stored-value provider 15c. Assume that customer 21b has a first SV account with stored-value provider 15b and a second SV account with stored-value provider 15c. By way of non-limiting example, and in reference to FIG. 2, assume that customer 21a has a first financial account with financial account provider 39a and a second financial account with financial account provider 39c. Assume that customer 21b has a first financial account with financial account provider 39b and a second financial account with financial account provider 39c. Provider component 22 may be configured to receive customer-specific information about customer 21a about balances in SV accounts with stored-value providers 15a and 15c, and/or about balances in financial accounts with financial account provider 39a and 39c. Provider component 22 may be configured to receive customer-specific information about customer 21b about balances in SV accounts with stored-value providers 15b and 15c, and/or about balances in financial accounts with financial account provider 39b and 39c.

In some embodiments, stored-value providers 15 may use customer-specific conversion rates to convert SV account balances into money. For example, long-time, high-worth, preferred, and/or very-important-person (VIP) customers may be offered better conversion rates. For example, conversion rates may depend on the SV account balance, on the percentage allocated to purchase investment funds, on the frequency of periodic investment fund purchases, the number of planned purchases, and/or any combination thereof. For example, a stored-value provider 15 may offer a particular conversion rate to customers who agree to sign up for at least a year's worth of monthly purchases of at least 10 percent of the customer's SV balance (optionally with the caveat that a customer must have at least a predetermined value as their SV account balance throughout that year). Other safeguards and/or restriction are envisioned within the scope of this disclosure.

Customer presentation component 23 may be configured to effectuate presentation of customer-specific information to customers. In some embodiments, customer presentation component 23 may be configured to effectuate presentations through interface 40. In some embodiments, customer presentation component 23 may be included in (and/or executed by a processor operating in service of) an administration provider 19. In some embodiments, customer presentation component 23 may be configured to effectuate presentations as appropriate, for example after customer authentication. The term "appropriate" refers to securing access to customer-specific information such that an individual customer can only access his personal information, and not the personal information of another customer. Customer-specific information may include, by way of non-limiting example, a balance of an account, e.g. an SV account with a stored-value provider 15, a balance of an investment account with an investment account provider 17, personal information and/or preferences, scheduled transfers and/or requests, and/or other information. For example, as depicted in FIG. 1 and FIG. 2, customer presentation component 23 may be configured to present an SV balance with stored-value provider 15a to customer 21a, an SV balance with stored-value provider 15b to customer 21b, a balance with financial account provider 39a to customer 21a, and a balance with financial account provider 39b to customer 21b.

Customer presentation component 23 may be configured to receive customer requests from customers, e.g. through entry and/or selection in interface 40. For example, an individual customer request may specify an amount of stored-value to be withdrawn from a SV account (and/or an amount of a financial account balance to be withdrawn from a financial account), and used to (effectuate a) purchase shares of one or more investment funds. In some embodiments, a customer request may include authorization for such a purchase and/or for related transfers to effectuate such a purchase.

By way of non-limiting example, and in reference to FIG. 2, customer presentation component 23 may be configured to receive a customer request from customer 21a to effectuate a purchase of an investment fund such that the purchase is funded by converting some of the balance in an account with stored-value provider 15a. The amount of the balance may be specified in the received customer request. Alternatively, and/or simultaneously, customer presentation component 23 may be configured to receive a customer request from customer 21a to effectuate a purchase of an investment fund such that the purchase is funded by withdrawing an amount from the balance in an account with financial account provider 39a.

For example, an amount of 10 loyalty points may be used from the account with stored-value provider 15a to purchase $100 of an investment fund. Store-value provider 15a may convert the 10 loyalty points into $100 (using a 1-to-10 conversion rate) and deposit the $100 (together with money from other customers) into sweep account 18a. Note that conversions, fees, and/or incentives may be used anywhere in system 10 such that the purchased amount of an investment fund may represent a value of less or more than $100, or exactly $100. Note that conversion rates may vary over time, may be customer-specific, and/or may be variable based on other considerations, as described elsewhere.

Alternatively, and/or simultaneously, an amount may be withdrawn from the balance of a financial account with a financial account provider 39 and deposited into an omnibus account with an omnibus account provider 37, in accordance with a customer request. Such a customer request may be triggered by and/or effectuated responsive to detections by monitor component 30. For example, a customer request may specify a particular social media stream to be monitored for instances of ITC, specify a particular financial account from which withdrawals are to be made, specify and/or effectuate a withdrawal of a predetermined amount from the particular financial account, responsive to detection of ITC, and/or purchase or authorize a purchase of one or more investment funds, wherein the purchase is funded by the withdrawn amount.

Customer presentation component 23 may be configured to automatically and/or periodically receive customer requests from a particular customer. Alternatively, and/or simultaneously, a single customer request may effectuate multiple and/or periodic purchases, for example a monthly purchase funded by a customer-specified percentage of an SV balance and/or other balance.

For example, the particular customer may request a monthly purchase of a particular investment fund of, say, 2% of a particular SV account balance, to occur on the $1^{st}$ of every month. Assume that (aggregated) deposits from this particular stored-value provider 15 into a sweep account with sweep account provider 18 occur on the $8^{th}$ of every month. Assume that deposits and/or transfers of (aggregated) balances from the sweep account to an investment account provider 17 occur on the $10^{th}$ of every month. Assume that (aggregated) purchases by an investment account provider 17 of shares of one or more investment funds (purchased from an investment provider 16) occur on the 15$^{th}$ of every month. In such an example, the actual purchase of investment funds on behalf of the particular customer may be delayed, e.g. by 14 days. Provider component 22 may be configured to effectuate presentation regarding such delays, regarding the timing of actual purchases, and regarding availability of the purchased investment funds in the investment account of the customer.

For example, the particular customer may request, by virtue of submitting investment triggering content in a social media stream associated with the particular customer, a purchase of a particular investment fund of, say, $10 of a particular financial account balance. Assume the investment trigger content is detected on the 1$^{st}$ of a particular month. Assume that (aggregated) deposits from this particular financial account provider 39 into an omnibus account with omnibus account provider 37 occur on the 8$^{th}$ of the particular month. Assume that deposits and/or transfers of (aggregated) balances from the omnibus account to an investment account provider 17 occur on the 10$^{th}$ of the particular month. Assume that (aggregated) purchases by an investment account provider 17 of shares of one or more investment funds (purchased from an investment provider 16) occur on the 15$^{th}$ of the particular month. In such an example, the actual purchase of investment funds on behalf of the particular customer may be delayed, e.g. by 14 days. Provider component 22 may be configured to effectuate presentation regarding such delays, regarding the timing of actual purchases, and regarding availability of the purchased investment funds in the investment account of the customer.

Monitor component 30 may be configured to monitor social media streams, e.g. social media streams provided and/or managed by one or more social media stream provider 38. In some embodiments, monitor component 30 may be configured to access, e.g. through one or more servers, one or more social media streams. Monitoring may be performed at an administration provider 19, at a social media provider 38, and/or elsewhere within system 10. In some embodiments, monitor component 30 may be configured to receive confirmations, e.g. from a social media provider 38, that a particular instance of ITC has occurred.

Monitor component 30 may be configured to detect occurrences of investment triggering content (ITC). Instances of ITC may be associated with a particular social media stream and/or a particular customer. In some embodiments, an instance of ITC includes a keyword or tag submitted to the particular social media stream by the particular customer. For example, a predefined keyword may be "#sumday". Responsive to detection, e.g. by monitor component 30, of an occurrence of ITC, deposit component 25 may transfer a transfer request or deposit request to a particular financial account provider 39 to withdraw an amount (e.g. a predetermined amount) from the financial account associated with and/or owned by the particular customer, and deposit the amount into a particular omnibus account with a particular omnibus account provider 37. From the particular omnibus account, the amount (optionally aggregated with amounts withdrawn from balances of other customers) may be transferred and/or deposited with investment account provider 17 to fund purchases of investment funds on behalf of the particular customer.

Account component 24 may be configured to receive (from investment account providers 17) and/or present (to customers) purchase information regarding purchases of investment funds. For example, purchase information may include confirmation of purchases performed by one or more investment account providers 17. In some embodiments, account component 24 may be included in (and/or executed by a processor operating in service of) an administration provider 19. In some embodiments, in relation to an individual customer and an individual purchase, account component 24 may be configured to receive and/or present adjustments to one or more of an SV balance and/or an investment account balance.

Deposit component 25 may be configured to receive deposit requests from stored-value providers 15 and financial account providers 39 (e.g. in the form of an ACH transfer). Deposit requests may be received on behalf of customers. In some embodiments, deposit requests may include no customer-specific information. Deposit requests may specify one or more particular sweep accounts of sweep account provider 18 and one or more omnibus accounts of omnibus account provider 37. Deposit requests may be accompanied by money or currency. Deposit component 25 may be configured to transfer money from one or more sweep accounts to investment account providers 17. Deposit component 25 may be configured to transfer money from one or more omnibus accounts to investment account providers 17. In some embodiments, deposit component 25 may be included in (and/or executed by a processor operating in service of) a sweep account provider 18. Alternatively, and/or simultaneously, in some embodiments, deposit component 25 may be included in (and/or executed by a processor operating in service of) an omnibus account provider 37. Deposit requests may effectuate amounts of money to be deposited in sweep accounts and/or omnibus accounts. Alternatively, and/or simultaneously, deposit requests may authorize purchases of shares of one or more investment funds, e.g. in accordance with corresponding customer requests from individual customers.

Transfer component 26 may be configured to transfer purchase requests to investment account providers 17. Purchase requests may authorize purchases of one or more shares of one or more investment funds. In some embodiments, transfer component 26 may be included in (and/or executed by a processor operating in service of) a sweep account provider 18. In some embodiments, transfer component 26 may be included in (and/or executed by a processor operating in service of) an omnibus account provider 37.

Bulk receipt component 27 may be configured to receive purchase requests that authorize purchases of one or more investment funds. Purchase requests may benefit one or more investment accounts owned by and/or associated with individual customers. The investment accounts may be provided and/or managed by investment account provider 17. Bulk receipt component 27 may be configured to receive one or more transfers of money, e.g. from one or more sweep accounts and/or from one or more omnibus accounts. The authorized purchases may be funded by the transferred money. In some embodiments, bulk receipt component 27 may be included in (and/or executed by a processor operating in service of) an investment account provider 17.

Bulk receipt component 27 may be configured to receive purchase requests from one or more of an administration provider 19, a sweep account provider 18, and/or an omnibus account provider 37. In some embodiments, purchase requests received from a sweep account provider 18 may correspond to customer-specific information received from an administration provider 19. In some embodiments, purchase requests may be split such that the money used for a purchase comes from a sweep account provider 18, and the accompanying customer-specific purchase information (including the specific one or more investment accounts to which the purchased investment funds are to be added) comes from an administration provider 19. By correlating information from different providers, an investment provider 17 may be able to complete purchases as requested. In some embodiments, purchase requests may be split such that the money used for a purchase comes from an omnibus account provider 37, and the accompanying customer-specific purchase information (including the specific one or more investment accounts to which the purchased investment funds are to be added) comes from an administration provider 19. By correlating information from different providers, an investment provider 17 may be able to complete purchases as requested.

Purchase component 28 may be configured to (periodically and/or automatically) purchase investment funds. Purchases may be aggregated on behalf of multiple customers. Purchases may correspond to requests received by investment account providers 17. Alternatively, and/or simultaneously, purchases may correspond to customer requests received from customers by administration provider 19. Purchases may be made by transferring an (aggregated) amount of money to an investment provider 16. In some embodiments, purchase component 28 may be included in (and/or executed by a processor operating in service of) an investment account provider 17.

Customer component 29 may be configured to receive customer-specific information from an administration provider 19. The customer-specific information may specify an amount to be used to purchase investment funds. In some embodiments, customer component 29 may be configured to adjust balances of investment accounts in accordance with purchases by the customers that own those investment accounts. In some embodiments, customer component 29 may be included in (and/or executed by a processor operating in service of) an investment account provider 17. Adjusted balances may be shared with an administration provided, e.g. to report to customers as appropriate.

By way of non-limiting example, and in reference to FIG. 2, customers 21 (e.g. customer 21a and customer 21b) may be presented, by administration provider 19, with customer-specific information from stored-value providers 15, including two SV account balances per customer in accordance with a previous example. Customer 21a may submit a request to the administration provider 19 to set up an automatic and monthly purchase of investment funds to be funded by withdrawing and converting 2% of the SV account balance managed by stored-value provider 15a and 3% of the SV account balance managed by stored-value provider 15c. Customer 21b may submit a request to the administration provider 19 to set up an automatic and monthly purchase of investment funds to be funded by withdrawing and converting 4% of the SV account balance managed by stored-value provider 15b and 5% of the SV account balance managed by stored-value provider 15c. Administration provider 19 may transfer these requests on behalf of customers 21a and 21b to stored-value providers 15a-15b-15c and to investment account provider 17. Stored-value providers 15a-15b-15c withdraw, on a monthly basis, the agreed-upon amount from the SV account balances of customers 21a and 21b, convert these amounts to money, and deposit, again on a monthly basis, this money in the appropriate sweep accounts of sweep account provider 18. Note that the deposit in sweep account 18c includes money from both customers. Sweep account provider 18 transfers money on a monthly (or other periodical) basis from the sweep accounts to investment account provider 17. Investment account provider 17 receives customer-specific information from administration provider 19 regarding the submitted requests to purchase investment funds. Investment account provider 17 purchases, on a monthly or other periodical basis, shares from one or more investment funds with the money transferred from the sweep accounts. Investment account provider 17 correlates the transferred money with the received customer-specific information in order to determine how many of the purchased shares of the one or more investment funds are to be added to the investment account owned by which individual customer. Administration provider 19 presents the customers with the adjusted balances. For example, per customer, the SV account balances may be reduced in total by an amount "X" and the investment account balance may be increased by an amount (at least based on) "X".

By way of non-limiting example, and in reference to FIG. 2, customers 21 (e.g. customer 21a and customer 21b) may be presented, by administration provider 19, with customer-specific information from financial account providers 15, including two financial account balances per customer in accordance with a previous example. Customer 21a may submit a request to the administration provider 19 to set up an automatic purchase (upon detection of an ITC) of investment funds to be funded by withdrawing a predetermined amount (e.g. $10) from the financial account balance managed by stored-value provider 39a. Customer 21b may submit a request to the administration provider 19 to set up an automatic purchase of investment funds to be funded by withdrawing a predetermined amount from the financial account balance managed by stored-value provider 39b. Administration provider 19 may transfer these requests on behalf of customers 21a and 21b to financial account providers 39a-39b and to investment account provider 17. Financial account providers 39a-39b withdraw, e.g. at the end of the current month, the agreed-upon amount from the financial account balances of customers 21a and 21b, and deposit this money in the appropriate omnibus accounts of omnibus account provider 37. Note that the deposit in a particular omnibus account may include money from multiple customers. Omnibus account provider 37 may transfer money on a regular, monthly, and/or other periodical basis from the omnibus accounts to investment account provider 17. Investment account provider 17 receives customer-specific information from administration provider 19 regarding the submitted requests to purchase investment funds. Investment account provider 17 purchases, on a regular, monthly, and/or other periodical basis, shares from one or more investment funds with the money transferred from the omnibus accounts. Investment account provider 17 correlates the transferred money with the received customer-specific information in order to determine how many of the purchased shares of the one or more investment funds are to be added to the investment account owned by which individual customer. Administration provider 19 may presents the customers with the adjusted balances. For example, per customer, the financial account balances may be reduced in total by an amount "X" and the investment account balance may be increased by an amount "X".

Figure 6A:
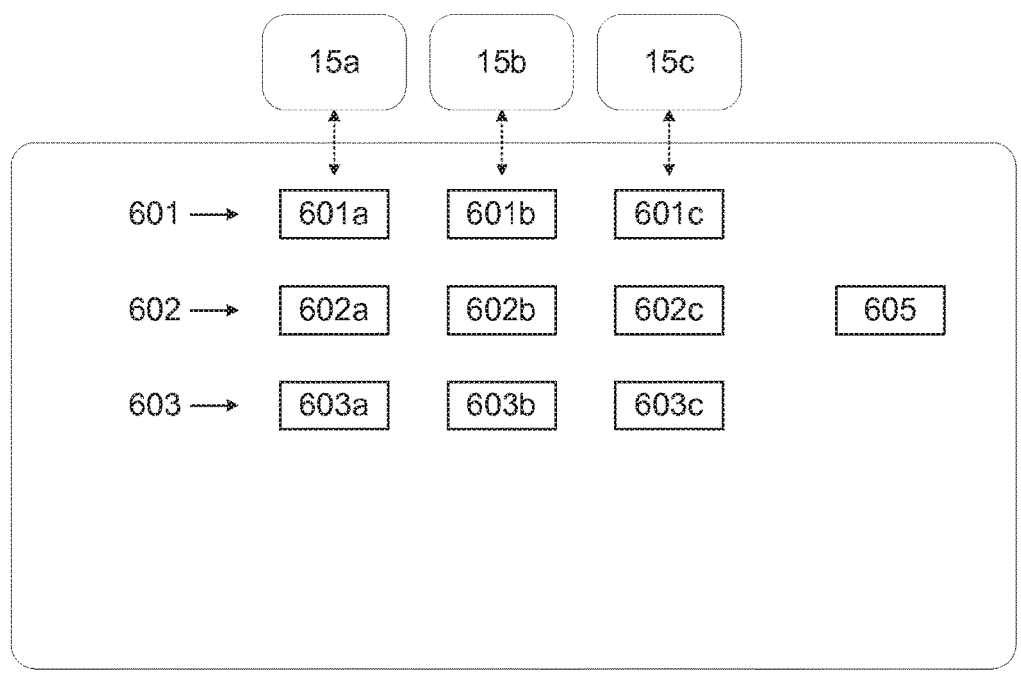
FIGS. 6A and 6B illustrate exemplary graphical user interfaces as may be used in a platform for investing closed-loop stored-value in accordance with one or more implementations.

By way of non-limiting example, FIG. 6A illustrates a graphical user interface 600 as may be used to present information to a particular user and provide interaction between the particular user and a system as described in this disclosure. Graphical user interface 600 may include user interface elements, including but not limited to current status elements 601, current transfer settings elements 602, scheduled action elements 603, settings restriction element 605, and/or other elements. Graphical user interface 600 may interact with one or more stored-value providers 15 (and/or financial account providers) that may operate outside of graphical user interface 600. As depicted in FIG. 6A, graphical user interface 600 may provide interaction with stored-value providers 15a-15b-15c.

Current status elements 601 may include multiple elements, for example, as depicted, current status elements 601a-601b-601c, which may reflect current account information (e.g. SV account balance) of the particular user with stored-value providers 15a-15b-15c, respectively. For example, the current SV account balances may be 100 "A" points with stored-value provider 15a, 200 "B" points with stored-value provider 15b, and 300 "C" points with stored-value provider 15c.

Current transfer settings elements 602 may include multiple elements, for example, as depicted, current transfer settings elements 602a-602b-602c, which may reflect the current settings for transferring and/or purchasing one or more investment funds using SV account balances of the particular user with stored-value providers 15a-15b-15c, respectively. For example, current settings may indicate a one-time transfer that is scheduled, or a periodical transfer. For example, current settings may indicate a fixed or a variable amount of a respective SV account balance to be used for a purchase. Fixed amounts may be indicated in points, for example "A" points, or in a percentage of the respective account balance, or in a combination of both, and/or in various other ways to indicate an amount. Current transfer settings elements 602 may include one or more fields for user entry and/or selection. For example, the user may adjust the current settings through providing input into current transfer settings elements 602. Interactivity may be supported for any element of graphical user interface 600.

Scheduled action elements 603 may include multiple elements, for example, as depicted, scheduled action elements 603a-603b-603c, which may reflect the next scheduled event, action, transfer, and/or purchase, e.g. of one or more investment funds using SV account balances of the particular user with stored-value providers 15a-15b-15c, respectively. For example, scheduled action elements 603 may present the (expected) date on which a withdrawal from a stored-value provider will be made, the (expected) date on which a purchase of one or more investment funds will be made on behalf of the particular user, an amount of an SV account balance to be used for a purchase, and/or other information pertaining to scheduled and/or expected events, actions, transfers, and/or purchases.

Settings restriction element 605 may present and/or reflect restrictions for a particular user in making and/or scheduling transfers and/or purchases. A first set of restrictions and/or rules may be imposed by a provider, including but not limited to a stored-value provider, a financial account provider, and/or an investment account provider. For example, a provider may impose one or both of a minimum amount and a maximum amount to be used for a transfer and/or purchase. A second set of restrictions and/or rules may be determined and/or desired by users. For example, a particular user may impose a maximum amount to be used for a transfer and/or purchase. For example, such a maximum amount may reflect a rule that may supersede one or more settings of current transfer settings elements 602. For example, current transfer setting element 602a may be set to a monthly purchase using 5% of the current SV account balance in "A" points. Settings restriction element 605 may for example impose a maximum amount of $100 per transfer and/or purchase. If the 5% exceeds the $100, the one or more rules reflected by settings restriction element 605 may trump other transfer settings and be controlling. In some embodiments, settings restriction element 605 may impose one or more restrictions and/or rules that apply to the combination of multiple current transfer settings elements 602, for example to all of them.

Figure 6B:
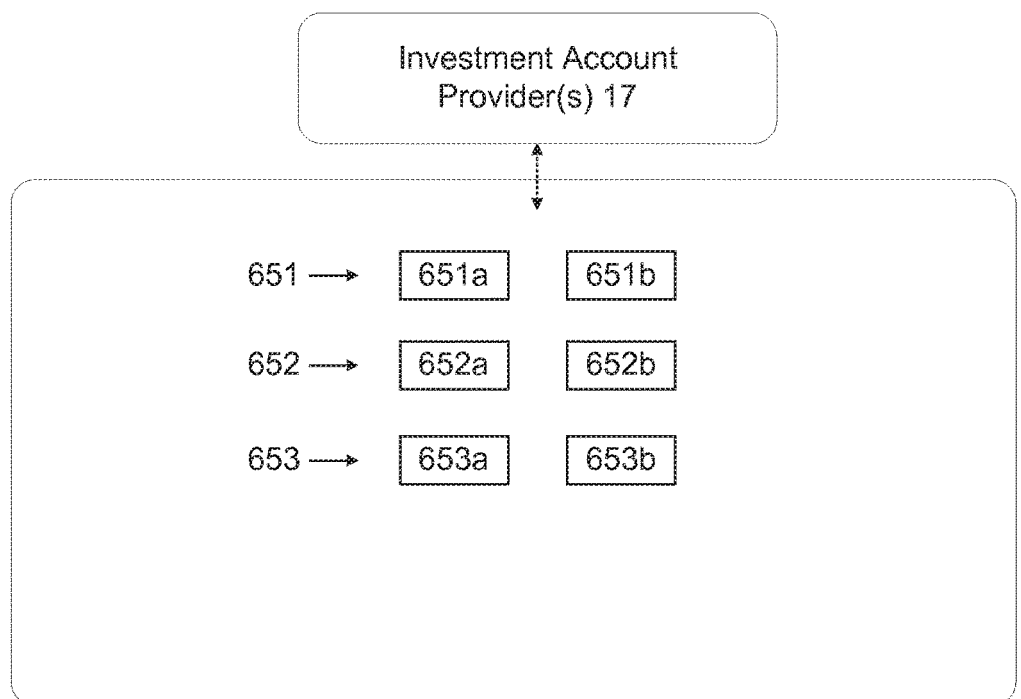
Figure 7:
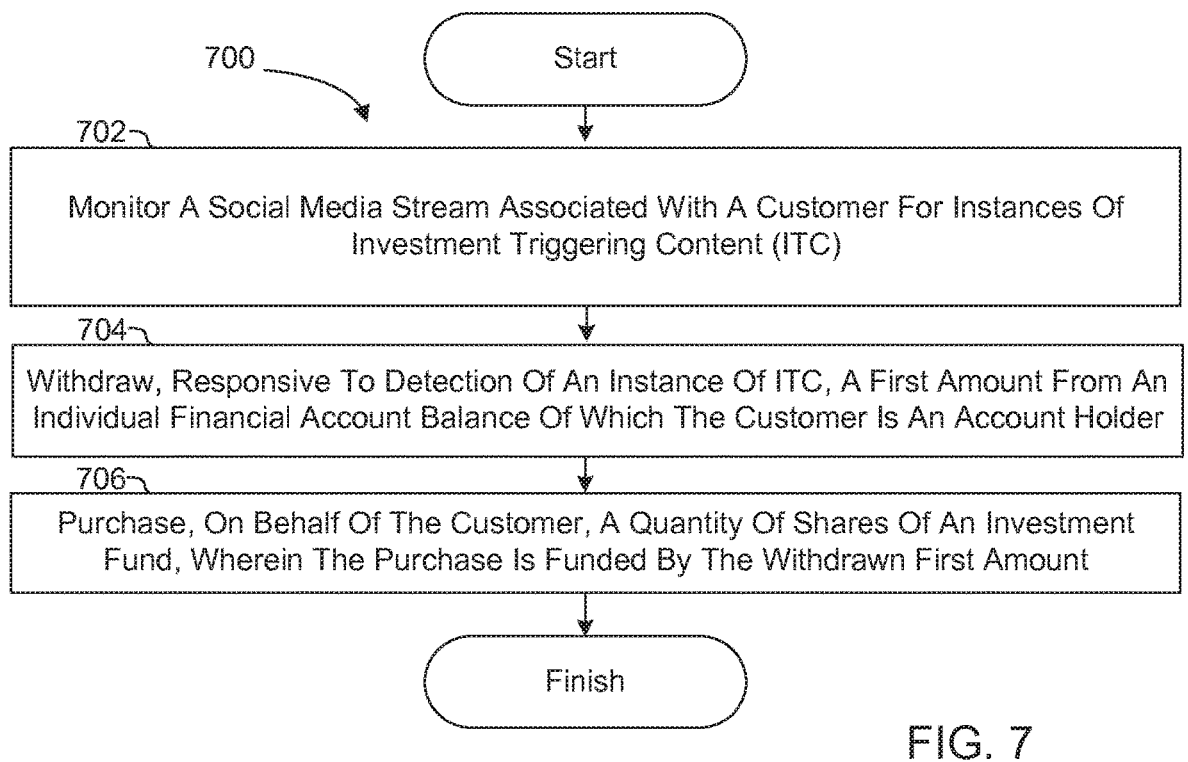

By way of non-limiting example, FIG. 6B illustrates a graphical user interface 650 as may be used to present information to a particular user and provide interaction between the particular user and a system as described in this disclosure. Graphical user interface 650 may include user interface elements, including but not limited to current status elements 651, scheduled action elements 652, information element 653, and/or other elements. Elements of graphical user interface 650 may include one or more fields for user entry and/or selection. Interactivity may be supported for any element of graphical user interface 650. Graphical user interface 650 may interact with one or more investment account providers 17 that may operate outside of graphical user interface 650. As depicted in FIG. 6B, graphical user interface 650 may provide interaction with a single investment account provider 17. Assume for FIG. 6B that investment account provider 17 provides the option to purchase two different investment funds, fund "A" and fund "B."

Current status elements 651 may include multiple elements, for example, as depicted, current status elements 651a-651b, which may reflect current investment account information (e.g. investment account balances with investment account provider 17) of the particular user. As depicted, the current investment account information reflects a balance of fund "A" (using current status element 651a) and fund "B" (using current status element 651b).

Scheduled action elements 652 may include multiple elements, for example, as depicted, scheduled action elements 652a-652b, which may reflect the next scheduled event, action, transfer, and/or purchase, e.g. of one or more investment funds. For example, information elements 653 may present the (expected) date on which a purchase of one or more investment funds will be made on behalf of the particular user, and/or other information pertaining to scheduled and/or expected balances, events, actions, transfers, and/or purchases. Information elements 653 may include multiple elements, for example, as depicted, information element 653a and 653b, which may reflect information (e.g. dates) regarding a balance, event, action, transfer, and/or purchase of fund "A" (using information element 653a) and fund "B" (using information element 653b).

Referring to FIG. 1, one or more processors 20 may be configured to provide information processing capabilities in system 10 and/or server 11. As such, processor 20 may include one or more of a digital processor, an analog processor, a digital circuit designed to process information, an analog circuit designed to process information, a state machine, and/or other mechanisms for electronically processing information. Although processor 20 may be shown in FIG. 1 as a single entity, this is for illustrative purposes only. In some embodiments, processor 20 may include a plurality of processing units. These processing units may be physically located within the same device, or processor 20 may represent processing functionality of a plurality of devices operating in coordination (e.g., "in the cloud", and/or other virtualized processing solutions).

It should be appreciated that although components 22-30, are illustrated in FIG. 1 as being co-located within a single processing unit, in implementations in which processor 20 includes multiple processing units, one or more of components 22-30 may be located remotely from the other components. The description of the functionality provided by the different components 22-30 described herein is for illustrative purposes, and is not intended to be limiting, as any of components 22-30 may provide more or less functionality than is described. For example, one or more of components 22-30 may be eliminated, and some or all of its functionality may be provided by other ones of components 22-30. As another example, processor 20 may be configured to execute one or more additional components that may perform some or all of the functionality attributed herein to one of components 22-30.

Physical storage 60 of system 10 in FIG. 1 may comprise electronic storage media that stores information. In some embodiments, physical storage 60 may store representations of computer program components, including instructions that implement the computer program components. The electronic storage media of physical storage 60 may include one or both of system storage that is provided integrally (i.e., substantially non-removable) with server 11 and/or removable storage that is removably connectable to server 11 via, for example, a port (e.g., a USB port, a FireWire™ port, etc.) or a drive (e.g., a disk drive, etc.). Physical storage 60 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), network-attached storage (NAS), and/or other electronically readable storage media. Physical storage 60 may include virtual storage resources, such as storage resources provided via a cloud and/or a virtual private network. Physical storage 60 may store software algorithms, information determined by processor 20, information received via client computing platforms 14, and/or other information that enable server 11 and system 10 to function properly. Physical storage 60 may be separate components within system 10, or physical storage 60 may be provided integrally with one or more other components of system 10 (e.g., processor 20).

FIGS. 3-4-5 and 7 illustrate methods 300-400-500 and 700 for implementing a platform for investing. The operations of methods 300-400-500 and 700 presented herein are intended to be illustrative. In some embodiments, methods 300-400-500 and 700 may be accomplished with one or more additional operations not described, and/or without one or more of the operations discussed. Additionally, the orders in which the operations of methods 300-400-500 and 700 are illustrated in FIG. 3, FIG. 4, FIG. 5, and FIG. 7, and described herein, are not intended to be limiting.

Figure 3:
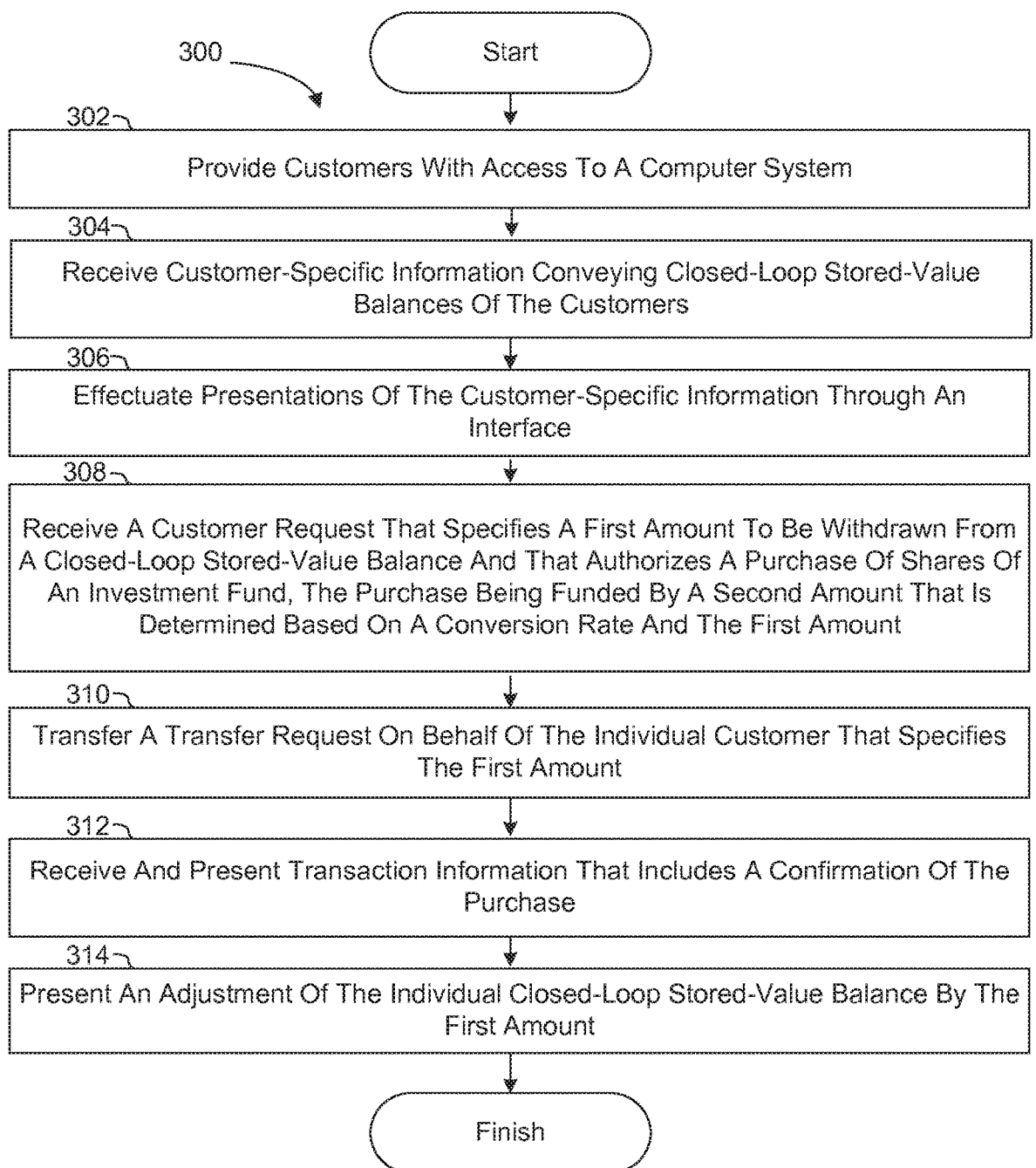
FIGS. 3, 4, 5, and 7 illustrate methods for implementing a platform for investing in accordance with one or more implementations.

Regarding FIG. 3 and method 300, at an operation 302, customers are provided with access to a computer system. In some embodiments, operation 302 is performed by an interface the same as or similar to interface 40 (shown in FIG. 1 and described herein).

At an operation 304, customer-specific information is received conveying CLSV account balances of the customers. In some embodiments, operation 304 is performed by a provider component the same as or similar to provider component 22 (shown in FIG. 1 and described herein).

At an operation 306, presentations are effectuated of the customer-specific information through the interface to the customers as appropriate. In some embodiments, operation 306 is performed by a customer component the same as or similar to customer presentation component 23 (shown in FIG. 1 and described herein).

At an operation 308, an individual customer request is received from an individual customer that i) specifies a first amount of closed-loop stored-value (CLSV) to be withdrawn from an individual CLSV account balance that is managed by an individual CLSV provider, wherein the individual CLSV account balance is associated with the individual customer, and ii) authorizes a purchase on behalf of the individual customer of one or more shares of one or more investment funds. The purchase is funded by a second amount. The second amount is determined based on a conversion rate and the first amount. In some embodiments, operation 308 is performed by a customer component the same as or similar to customer presentation component 23 (shown in FIG. 1 and described herein).

At an operation 310, a transfer request is transferred on behalf of the individual customer. The transfer request specifies the first amount. In some embodiments, operation 310 is performed by a provider component the same as or similar to provider component 22 (shown in FIG. 1 and described herein).

At an operation 312, purchase information is received and presented that includes a confirmation of the purchase. In some embodiments, operation 312 is performed by an account component the same as or similar to account component 24 (shown in FIG. 1 and described herein).

At an operation 314, an adjustment of the individual CLSV account balance by the first amount is presented. In some embodiments, operation 314 is performed by an account component the same as or similar to account component 24 (shown in FIG. 1 and described herein).

Figure 4:
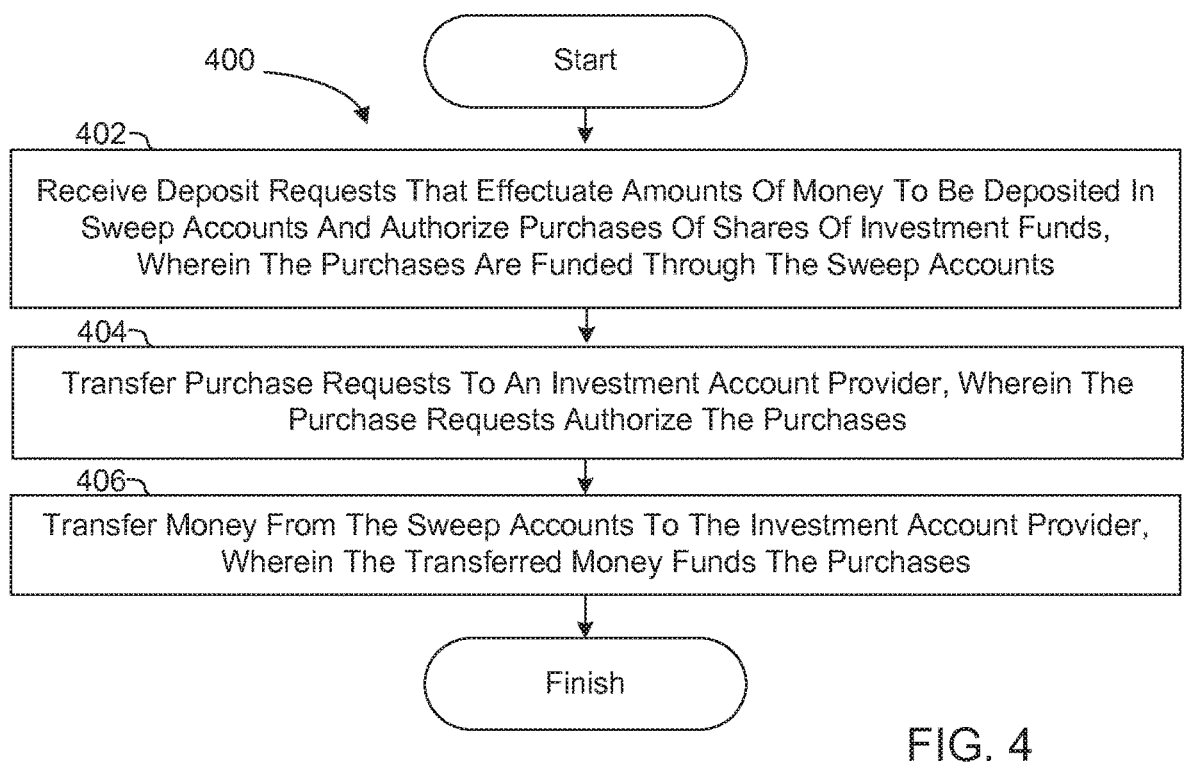

Regarding FIG. 4 and method 400, at an operation 402, deposit requests are received from the CLSV providers and on behalf of the customers. The deposit requests firstly effectuate amounts of money to be deposited in sweep accounts managed by a sweep account provider. The amounts of money correspond to customer-authorized withdrawals from the CLSV account balances. The sweep accounts are associated with the CLSV providers. The deposit requests secondly authorize purchases of shares of one or more investment funds. The purchases are funded by one or more transfers of money from the sweep accounts. In some embodiments, operation 402 is performed by a deposit component the same as or similar to deposit component 25 (shown in FIG. 1 and described herein).

At an operation 404, purchase requests are transferred (to an investment account provider) that benefit one or more investment accounts managed by an investment account provider. The purchase requests authorize the purchases of shares of one or more investment funds. In some embodiments, operation 404 is performed by a transfer component the same as or similar to transfer component 26 (shown in FIG. 1 and described herein).

At an operation 406, the one or more transfers of money from the sweep accounts to the one or more investment accounts are performed. Individual investment accounts are owned by individual customers. The transferred money funds the authorized purchases. In some embodiments, operation 406 is performed by a deposit component the same as or similar to deposit component 25 (shown in FIG. 1 and described herein).

Figure 5:
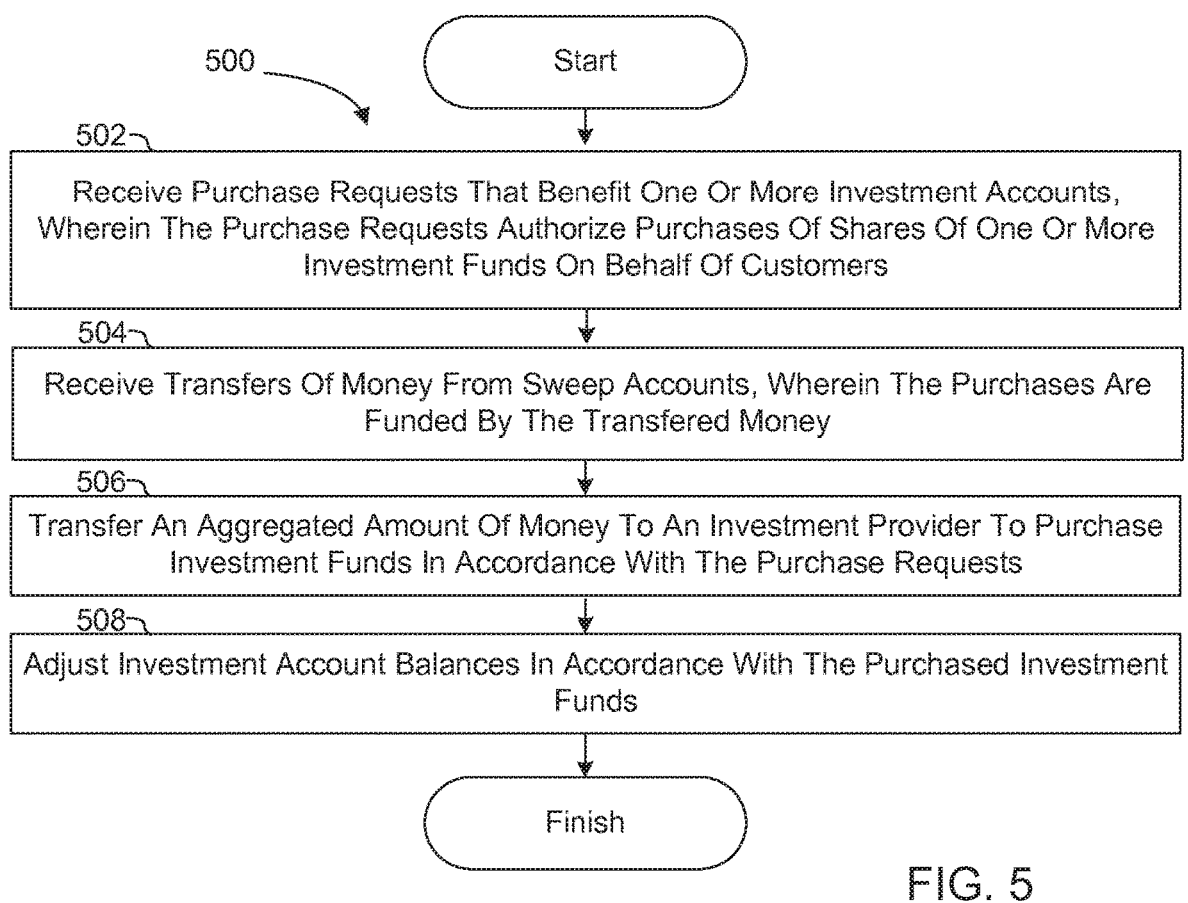

Regarding FIG. 5 and method 500, at an operation 502, purchase requests are received that benefit one or more investment accounts managed by an investment account provider. The purchase requests authorize the purchases of shares of one or more investment funds on behalf of the customers. Individual investment accounts are owned by individual customers. In some embodiments, operation 502 is performed by a bulk receipt component the same as or similar to bulk receipt component 27 (shown in FIG. 1 and described herein).

At an operation 504, one or more transfers of money are received from sweep accounts managed by a sweep account provider to the one or more investment accounts. The purchases are funded by the transferred money. In some embodiments, operation 504 is performed by a bulk receipt component the same as or similar to bulk receipt component 27 (shown in FIG. 1 and described herein).

At an operation 506, an aggregated amount of money is transferred to an investment provider, that corresponds to the received one or more transfers of money, to purchase shares of the one or more investment funds in accordance with the received purchase requests. In some embodiments, operation 506 is performed by a purchase component the same as or similar to purchase component 28 (shown in FIG. 1 and described herein).

At an operation 508, balances of individual investment accounts are adjusted in accordance with the purchased shares of the one or more investment funds. In some embodiments, operation 508 is performed by a customer component the same as or similar to customer component 29 (shown in FIG. 1 and described herein).

Regarding FIG. 3 and method 300, at an operation 702, a social media stream associated with a customer is monitored for instances of investment triggering content (ITC). In some embodiments, operation 702 is performed by a monitor component the same as or similar to monitor component 30 (shown in FIG. 1 and described herein).

At an operation 704, responsive to detection of an instance of ITC, a first amount is withdrawn from an individual financial account balance of which the customer is an account holder. In some embodiments, operation 704 is performed by a deposit component the same as or similar to deposit component 25 (shown in FIG. 1 and described herein).

At an operation 706, on behalf of the customer, a quantity of shares of an investment fund is purchased. The purchase is funded by the withdrawn first amount. In some embodiments, operation 706 is performed by a purchase component the same as or similar to purchase component 28 (shown in FIG. 1 and described herein).

In some embodiments, methods 300-400-500 and 700 may be implemented in one or more processing devices (e.g., a server, a digital processor, an analog processor, a digital circuit designed to process information, an analog circuit designed to process information, and/or other mechanisms for electronically processing information). The one or more processing devices may include one or more devices executing some or all of the operations of methods 300-400-500 and 700 in response to instructions stored electronically on an electronic and/or physical storage medium. The one or more processing devices may include one or more devices configured through hardware, firmware, and/or software to be specifically designed for execution of one or more of the operations of methods 300-400-500 and 700.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation (or claim) can be combined with one or more features of any other implementation (or claim).

What is claimed is:

1. A system comprising: an interface configured to provide customers with access to the system; one or more physical processors configured to execute computer program instructions that, when executed, cause the system to:
receive, by the one or more physical processors, via the interface, a request from a customer, wherein the request indicates (i) a social media stream associated with the customer to be monitored for instances of investment triggering content (ITC);
configure, by the one or more physical processors, a customer account of the customer based on the request;
monitor, by the one or more physical processors, based on the customer account configuration, the social media stream for instances of ITC;
responsive to the monitoring detecting an instance of ITC, withdraw, by the one or more physical processors, a first amount from the customer account;
execute, by the one or more physical processors, on behalf of the customer, a purchase of a quantity of shares of an investment fund using the withdrawn first amount; and
display, by the one or more physical processors, a confirmation of the purchase via the interface.

2. The system of claim 1, wherein investment triggering content (ITC) includes a predefined keyword that is submitted to the social media stream by the customer.

3. The system of claim 1, wherein the monitored social media stream is managed through a social media account of which the customer is an account holder.

4. The system of claim 1, wherein access to the social media stream is provided by a social media provider, and wherein the social media stream is monitored by obtaining information from a server associated with the social media provider.

5. The system of claim 1, wherein the purchase of the quantity of shares of the investment fund is accomplished through interaction with a server associated with an investment account provider.

6. The system of claim 1, wherein the request indicates (i) the social media stream, (ii) the first amount, and (iii) a pre-authorization for the purchase.

7. The system of claim 6, wherein the request operates as a standing order to repeatedly withdraw a predetermined amount from the customer account responsive to detection of an individual instance of ITC, and repeatedly purchase shares of the investment fund using the withdrawn predetermined amount.

8. The system of claim 6, wherein the request further indicates a maximum purchase limit per a predetermined duration of time.

9. The system of claim 1, wherein the system is caused to:
responsive to the monitoring detecting a second instance of ITC, withdraw a second amount from the customer account; and
gather, prior to the purchase, the first amount and the second amount,
wherein the purchase is further funded by the withdrawn second amount.

10. The system of claim 1, wherein the purchase is aggregated with purchases on behalf of other customers.

11. The system of claim 1, wherein performance of the purchase is delayed by a first delay compared to the detection of the instance of ITC.

12. A computer-implemented method comprising:
receiving, by one or more physical processors, via an interface, a request from a customer, wherein the request indicates (i) a social media stream associated with the customer to be monitored for instances of investment triggering content (ITC);

configuring, by the one or more physical processors, a customer account of the customer based on the request;

monitoring, by the one or more physical processors, based on the customer account configuration, the social media stream for instances of ITC;

responsive to the monitoring detecting an instance of ITC, withdrawing, by the one or more physical processors, a first amount from the customer account;

executing, by the one or more physical processors, on behalf of the customer, a purchase of a quantity of shares of an investment fund using the withdrawn first amount; and displaying, by the one or more physical processors, a confirmation of the purchase via the interface.

13. The method of claim 12, wherein investment triggering content (ITC) includes a predefined keyword that is submitted/posted to the social media stream by the customer.

14. The method of claim 12, wherein the monitored social media stream is managed through a social media account of which the customer is an account holder.

15. The method of claim 12, wherein access to the social media stream is provided by a social media provider, and wherein monitoring the social media stream includes obtaining information from a server associated with the social media provider.

16. The method of claim 12, wherein purchasing the quantity of shares of the investment fund is accomplished through interaction with a server associated with an investment account provider.

17. The method of claim 12, wherein the request indicates (i) the social media stream, (ii) the first amount, and (iii) a pre-authorization for the purchase.

18. The method of claim 17, wherein the request operates as a standing order to repeatedly withdraw a predetermined amount from the customer account responsive to detection of an individual instance of ITC, and repeatedly purchase shares of the investment fund using the withdrawn predetermined amount.

19. The method of claim 17, wherein the request further indicates a maximum purchase limit per a predetermined duration of time.

20. The method of claim 12, further comprising:
responsive to the monitoring detecting a second instance of ITC, a second amount from the customer account; and
gathering, prior to the purchase, the first amount and the second amount,
wherein the purchase is further funded by the withdrawn second amount.

21. The method of claim 12, wherein the purchase is aggregated with purchases on behalf of other customers.

22. The method of claim 12, wherein the purchase is delayed by a first delay compared to the detection of the instance of ITC.

23. One or more non-transitory computer-readable media comprising computer program instructions that, when executed by one or more physical processors, cause operations comprising:

receiving, by the one or more physical processors, via an interface, a request from a customer, wherein the request indicates (i) a social media stream associated with the customer to be monitored for instances of investment triggering content (ITC);

configuring, by the one or more physical processors, a customer account of the customer based on the request;

monitoring, by the one or more physical processors, based on the customer account configuration, the social media stream for instances of ITC;

responsive to the monitoring detecting an instance of ITC, withdrawing, by the one or more physical processors, a first amount from the customer account;

executing, by the one or more physical processors, on behalf of the customer, a purchase of a quantity of shares of an investment fund using the withdrawn first amount; and displaying, by the one or more physical processors, a confirmation of the purchase via the interface.

24. The media of claim 23, wherein investment triggering content (ITC) includes a predefined keyword that is submitted/posted to the social media stream by the customer.

25. The media of claim 23, wherein the monitored social media stream is managed through a social media account of which the customer is an account holder.

26. The media of claim 23, wherein access to the social media stream is provided by a social media provider, and wherein monitoring the social media stream includes obtaining information from a server associated with the social media provider.

27. The media of claim 23, wherein purchasing the quantity of shares of the investment fund is accomplished through interaction with a server associated with an investment account provider.

28. The media of claim 23, wherein the request indicates (i) the social media stream, (ii) the first amount, and (iii) a pre-authorization for the purchase.

29. The media of claim 28, wherein the request operates as a standing order to repeatedly withdraw a predetermined amount from the customer account responsive to detection of an individual instance of ITC, and repeatedly purchase shares of the investment fund using the withdrawn predetermined amount.

30. The media of claim 28, wherein the request further indicates a maximum purchase limit per a predetermined duration of time.

31. The media of claim 23, further comprising:
responsive to the monitoring detecting a second instance of ITC, a second amount from the customer account; and
gathering, prior to the purchase, the first amount and the second amount,
wherein the purchase is further funded by the withdrawn second amount.

32. The media of claim 23, wherein the purchase is aggregated with purchases on behalf of other customers.

33. The media of claim 23, wherein the purchase is delayed by a first delay compared to the detection of the instance of ITC.

* * * * *